United States Patent
Ke et al.

(10) Patent No.: US 11,038,598 B1
(45) Date of Patent: Jun. 15, 2021

(54) METHOD AND APPARATUS FOR TRANSMIT/RECEIVE RADIO FREQUENCY CROSSTALK COMPENSATION IN A PHOTONIC INTEGRATED CIRCUIT

(71) Applicants: Jianhong Ke, Stittsville (CA); Chuandong Li, Ottawa (CA)

(72) Inventors: Jianhong Ke, Stittsville (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/801,608

(22) Filed: Feb. 26, 2020

(51) Int. Cl.
*H04B 10/40* (2013.01)
*H04B 10/61* (2013.01)
*H04B 3/32* (2006.01)

(52) U.S. Cl.
CPC ........... *H04B 10/6162* (2013.01); *H04B 3/32* (2013.01); *H04B 10/40* (2013.01)

(58) Field of Classification Search
CPC .................................................. H04B 10/616
See application file for complete search history.

(56) References Cited

U.S. PATENT DOCUMENTS

| | | | |
|---|---|---|---|
| 2013/0201472 A1* | 8/2013 | Joffe | G01D 5/35354 356/73.1 |
| 2013/0230312 A1 | 9/2013 | Randel et al. | |
| 2013/0302031 A1* | 11/2013 | Tanimura | H04B 10/07 398/38 |
| 2015/0288418 A1* | 10/2015 | Zhou | H04B 10/697 398/115 |
| 2019/0391348 A1* | 12/2019 | Osenbach | H04B 10/40 |

FOREIGN PATENT DOCUMENTS

| | | |
|---|---|---|
| CN | 103609040 A | 2/2014 |
| CN | 103988450 A | 8/2014 |
| CN | 108344984 A | 7/2018 |
| EP | 2930867 A1 | 10/2015 |

\* cited by examiner

*Primary Examiner* — Shi K Li

(57) ABSTRACT

Aspects of the present application provide methods and devices for compensating crosstalk in in the digital domain, the crosstalk occurring in the analog domain, for an optical coherent transceiver on a photonic integrated circuit (PIC).

25 Claims, 8 Drawing Sheets

METHOD AND APPARATUS FOR TRANSMIT/RECEIVE RADIO FREQUENCY CROSSTALK COMPENSATION IN A PHOTONIC INTEGRATED CIRCUIT

TECHNICAL FIELD

The present disclosure relates generally to crosstalk compensation with optical elements or apparatus, and in particular embodiments, to crosstalk compensation between transmit and receive signals in a photonic integrated circuit (PIC).

BACKGROUND

Photonic integrated circuits (PICs) integrate multiple components such as lasers, modulators, and detectors on a single chip. Such devices are popular due to their small size, low cost and added functionality and value.

A transceiver implemented on a PIC can include a transmitter and a receiver in close proximity to one another. Due to the small size of PICs, radio frequency (RF) crosstalk can significantly affect performance of the device. The RF components and wires are very close to each other in a PIC, which can significantly increase RF signal crosstalk between transmit and receive pathways causing performance degradation. The smaller the footprint of the PIC, the larger effect the crosstalk may have on the device.

A coherent optical transmission system is capable of performing coherent detection, which involves an optical receiver tracking the phase of a signal from the optical transmitter. As phase coherence is maintained between the transmitter and receiver, it is possible to enable multiple channels that are out of phase with one another between the transmitter and receiver. In a coherent optical transceiver, a transmitter driver amplifies signals for four separate channels. The four channels correspond to a real component of a horizontal polarization component of the transmission signal, a real component of a vertical polarization component of the transmission signal, an imaginary component of a horizontal polarization component of the transmission signal, and an imaginary component of a vertical polarization component of the transmission signal. The crosstalk exists amongst all the branches. The strength of crosstalk increases with closer geometric distance on the PIC.

In a coherent transceiver implemented on a PIC, a drive signal in a transmitter chain of the transceiver is much larger than a received signal in the receiver chain. This can result in the crosstalk between the transmitter chain and receiver chain being even worse. Therefore, RF crosstalk compensation is important to improve the performance of PICs.

Some crosstalk can be decreased by careful RF design. However, in a coherent optical transceiver implemented on a PIC, RF signals in the transmitter have a much larger power than RF signals in the receiver. The RF signal in the transmitter chain may be as much as 20 dB higher than the received signal in the receiver chain. Therefore, higher RF isolation is important for such an implementation. Furthermore, in some implementations the arrangement of the transmitter and the receiver have little room for repositioning with respect to one another because the PIC may be connected with a digital signaling processor application-specific integrated circuit (DSP ASIC) with device pinout that is fixed.

Therefore, improved mechanisms for crosstalk compensation for coherent optical transceivers would be beneficial for optical communication systems, especially when trying to further reduce footprint size and costs.

SUMMARY

Because a photonic integrated circuit (PIC) is typically small, the performance of the PIC can be significantly affected by radio frequency (RF) crosstalk. In the case of a coherent transceiver, the drive signal at the transmitter side is much larger than the received signal at the receiver side, which makes the crosstalk impairment even worse. Therefore, RF crosstalk compensation is critical to the performance of PIC.

Embodiments disclosed herein provide a low-cost and efficient solution to compensate transmitter/receiver RF crosstalk that occurs in the analog domain by implementing the solution in a digital signal processor (DSP) in the digital domain.

According to some aspects to the present disclosure, there is provided a method involving in the digital domain, compensating crosstalk occurring in the analog domain between transmit and receive radio frequency (RF) signals in a coherent optical transceiver implemented on a photonic integrated circuit.

In some embodiments, the compensating involves, in the digital domain, generating a crosstalk compensation element by delaying at least one component of a digital domain version of a RF transmission signal and convolving the at least one delayed component of the digital domain version of the RF transmission signal with a digital domain version of an impulse response, the crosstalk occurring between an analog domain version of the at least one signal component of the RF transmission signal and an analog domain version of at least one component of an analog domain version of a RF receive signal and subtracting the crosstalk compensation element from a digital domain version of the crosstalk affected RF receive signal.

In some embodiments, the method further involves upsampling the at least one component of the digital domain version of the RF transmission signal and the digital domain version of the crosstalk affected RF receive signal.

In some embodiments, the method further involves converting the at least one component of the digital domain version of the RF transmission signal to an analog domain version of the at least one component of the RF transmission signal.

In some embodiments, the method further involves converting the analog domain version of the crosstalk affected RF receive signal to the digital domain version of the crosstalk affected RF receive signal.

In some embodiments, in the digital domain, the at least one signal component of the digital domain version of the RF transmission signal is a version of the at least one signal component that has not been pre-compensated for effects of additional processing on a transmit chain in the coherent optical transceiver.

In some embodiments, the digital domain version of the RF transmission signal includes one or more of: a) a digital domain version of a real component of a horizontal polarization component of the transmission signal; b) a digital domain version of a real component of a vertical polarization component of the transmission signal; c) a digital domain version of an imaginary component of a horizontal polarization component of the transmission signal; and d) a digital domain version of an imaginary component of a vertical polarization component of the transmission signal.

In some embodiments, the analog domain version of the RF receive signal comprises one or more of: a) a real component of a horizontal polarization component of the receive signal; b) a real component of a vertical polarization component of the receive signal; c) an imaginary component of a horizontal polarization component of the receive signal; and d) an imaginary component of a vertical polarization component of the receive signal.

In some embodiments, the method further involves, during a calibration period when a receiver chain of the coherent optical transceiver is configured in an open circuit mode such that no receive data is processed, determining a delay used in the delaying of the at least one component of the digital domain version of the RF transmission signal and determining the impulse response used in convolving the at least one delayed component of the digital domain version of the RF transmission signal to generate the crosstalk compensation element.

In some embodiments, the method further involves during a calibration period, the receiver chain is receiving data, determining the delay used in the delaying of the at least one component of the digital domain version of the RF transmission signal; and determining the impulse response used in convolving the at least one delayed component of the digital domain version of the RF transmission signal to generate the crosstalk compensation element.

In some embodiments, the impulse response is determined using the formula:

$$\vec{H} = [[TxSig]^T \cdot [TxSig]]^{-1} \cdot [TxSig]^T \cdot \vec{S}_{Xtalk}$$

wherein $\vec{H}$ is the impulse response, [TxSig] is a matrix representation of a digital domain version of the signal on the at least one channel of the RF transmission signal, $[TxSig]^T$ is the transpose of the matrix representation of the digital domain version of the signal on the at least one channel of the RF transmission signal, and $\vec{S}_{Xtalk}$ is the digital domain version of the crosstalk affected RF receive signal.

In some embodiments, the impulse response is determined using a matrix based calculation.

According to some aspects to the present disclosure, there is provided a digital signal processor (DSP) configured to: in the digital domain, compensate crosstalk occurring in the analog domain between transmit and receive radio frequency (RF) signals in a coherent optical transceiver implemented on a photonic integrated circuit.

In some embodiments, the DSP is configured to, in the digital domain, generate a crosstalk compensation element by delaying at least one component of a digital domain version of a RF transmission signal, and convolving the at least one delayed component of the digital domain version of the RF transmission signal with a digital domain version of an impulse response, the crosstalk occurring between an analog domain version of the at least one signal component of the RF transmission signal and an analog domain version of at least one component of an analog domain version of a RF receive signal, and subtract the crosstalk compensation element from a digital domain version of the crosstalk affected RF receive signal.

In some embodiments, the DSP is further configured to upsample the at least one component of the digital domain version of the RF transmission signal and the digital domain version of the crosstalk affected RF received signal.

In some embodiments, the DSP is further configured to convert the at least one component of the digital domain version of the RF transmission signal to an analog domain version of the at least one component of the RF transmission signal.

In some embodiments, the DSP is further configured to convert the analog domain version of the crosstalk affected RF receive signal to the digital domain version of the crosstalk affected RF received signal.

In some embodiments, in the digital domain, the at least one signal component of the digital domain version of the RF transmission signal is a version of the at least one signal component that has not been pre-compensated for effects of additional processing on a transmit chain in the coherent optical transceiver.

In some embodiments, wherein the at least one component of a digital domain version of the RF transmission signal comprises one or more of: a) a digital domain version of a real component of a horizontal polarization component of the transmission signal; b) a digital domain version of a real component of a vertical polarization component of the transmission signal; c) a digital domain version of an imaginary component of a horizontal polarization component of the transmission signal; and d) a digital domain version of an imaginary component of a vertical polarization component of the transmission signal.

In some embodiments, wherein the at least one component of the analog domain version of the RF receive signal comprises one or more of: a) a real component of a horizontal polarization component of the receive signal; b) a real component of a vertical polarization component of the receive signal; c) an imaginary component of a horizontal polarization component of the receive signal; and d) an imaginary component of a vertical polarization component of the receive signal.

In some embodiments, the DSP is further configured to, during a period when a receiver chain of the coherent optical transceiver is configured in an open circuit mode such that no received data is processed: determine a delay used in the delaying the at least one component of the digital domain version of the RF transmission signal; and determine the impulse response used in convolving the at least one delayed component of the digital domain version of the RF transmission signal to generate the crosstalk compensation element.

In some embodiments, the DSP is further configured to, during a calibration period when a receiver chain of the coherent optical transceiver is receiving data: determine a delay used in the delaying the at least one component of the digital domain version of the RF transmission signal; and determine the impulse response used in convolving the at least one delayed component of the digital domain version of the RF transmission signal to generate the crosstalk compensation element.

In some embodiments, the impulse response is determined using the formula:

$$\vec{H} = [[TxSig]^T \cdot [TxSig]]^{-1} \cdot [TxSig]^T \cdot \vec{S}_{Xtalk}$$

wherein $\vec{H}$ is the impulse response, [TxSig] is a matrix representation of a digital domain version of the signal on the at least one channel of the RF transmission signal, $[TxSig]^T$ is the transpose of the matrix representation of the digital domain version of the signal on the at least one channel of the RF transmission signal, and $\vec{S}_{Xtalk}$ is the digital domain version of the crosstalk affected RF receive signal.

In some embodiments, the impulse response is determined using a matrix based calculation.

According to some aspects to the present disclosure, there is provided a coherent optical transceiver implemented on a photonic integrated circuit comprising a digital signal processor as described in the embodiments above.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
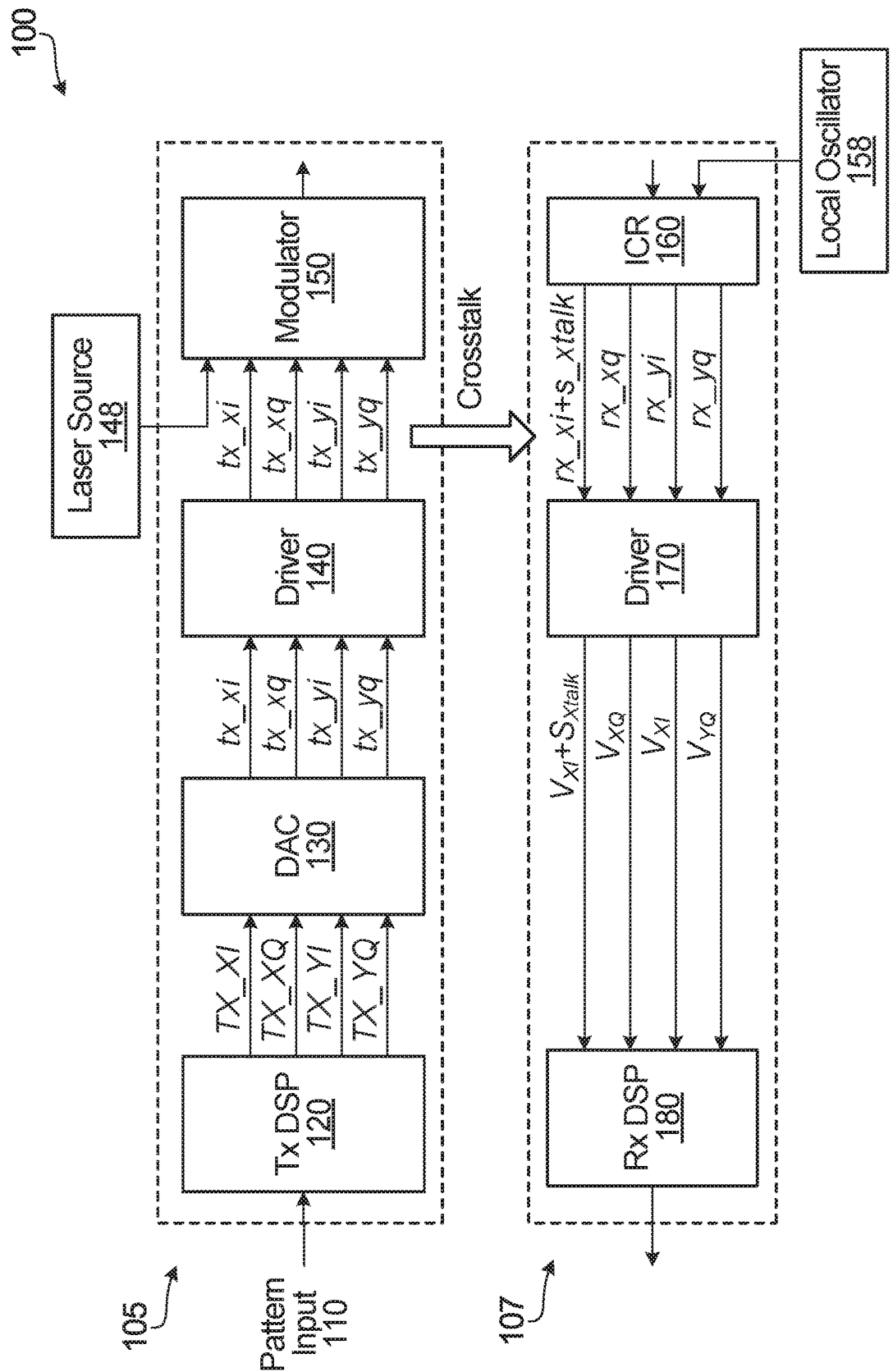
FIG. 1 is a block diagram of a coherent transceiver demonstrating potential crosstalk between a transmitter chain and a receiver chain in close proximity to one another.

FIG. 1 shows a block diagram of a coherent optical transceiver 100. The coherent optical transceiver 100 includes a transmit chain 105 and a receive chain 107 in close proximity. An input to the transmit chain 105 is a digital domain signal that includes a set of bits 110 that corresponds to a pattern to be transmitted. The set of bits 110 are received by a transmitter chain digital signal processor (Tx DSP) 120 which generates four separate digital domain channel signals, i.e. a real component of a horizontal polarization component (TX_XI) of the transmit signal, a real component of a vertical polarization component (TX_YI) of the transmit signal, an imaginary component of a horizontal polarization component (TX_XQ) of the transmit signal, and an imaginary component of a vertical polarization component (TX_YQ) of the transmit signal. For the purposes of discussion, lower-case letters are used when referring to a signal in the analog domain and capital letters are used when referring to a signal in the digital domain. Outputs of the Tx DSP 120 are provided to a digital to analog converter (DAC) 130. The DAC 130 converts the digital domain signals to analog domain signals., i.e. a real component of a horizontal polarization component (tx_xi) of the transmit signal, a real component of a vertical polarization component (tx_yi) of the transmit signal, an imaginary component of a horizontal polarization component (tx_xq) of the transmit signal, and an imaginary component of a vertical polarization component (tx_yq) of the transmit signal. An output of the DAC 130 is provided to a transmitter chain driver 140. The driver 140 amplifies the RF signals. Each of the four separate channel signals is provided to a modulator 150. A laser source 148 is shown as an input to the modulator 150. An output of the laser source 148 is modulated using the four separate channel signals input to the modulator. It can be considered that the pattern input 110 and processing in the Tx DSP 120 occur in the digital domain and subsequent to the DAC 130, the signal and any processing occur in the analog domain.

A signal that is received by receiver chain 107 of the coherent optical transceiver 100 is an analog domain signal and is input to an integrated coherent receiver (ICR) 160. Another input to the ICR 160 is a local oscillator 158 used by the ICR in recovering the received signal. The ICR 160, with the aid of the LO 158, converts the received signal into four separate signals, of the same type as in the transmitter, i.e. a real component of a horizontal polarization component (rx_xi) of the receive signal, a real component of a vertical polarization component (rx_yi) of the receive signal, an imaginary component of a horizontal polarization component (rx_xq) of the receive signal, and an imaginary component of a vertical polarization component (rx_yq) of the receive signal. Signals on the four separate channels output from the ICR 160 are provided to an analog to digital converter (ADC) 170. The ADC 170 coverts the analog domain signals on the four channels to digital domain versions of those signals. The four channel outputs of the ADC 170 are provided to a receiver chain DSP 180, which converts the signals of the four channels into a single set of bits in the digital domain. It can be considered that the received signal at the ICR 160 and crosstalk that happens between the transmitter chain and the receiver chain occur in the analog domain and after the ADC 170 the signal and any processing occur in the digital domain.

Crosstalk occurs in the analog domain between the signals in the four separate channels between the driver 140 and the modulator 150 in the transmitter chain 105 and the four separate channels between the ICR 160 and the ADC 170 in the receiver chain 107. Crosstalk can occur between any of the four transmitter chain signals and any of the four receiver chain signals. For example, the real component of a horizontal polarization component of the transmission signal can cause crosstalk with the real component of a horizontal polarization component of the receive signal, the real component of a vertical polarization component of the receive signal, the imaginary component of a horizontal polarization component of the receive signal, and the imaginary component of a vertical polarization component of the receive signal. Each of the other three RF transmission signals can likewise cause cross talk with the four RF receive signal components.

The strength of crosstalk increases with closer geometric distance on the PIC. Therefore, in FIG. 1, the most significant crosstalk occurs between tx_yq and tx_xi, as these are the two closest transmit and receive signal paths.

FIG. 1 shows a value s_xtalk added to tx_xi as a representative of the crosstalk that is added to tx_xi. The value s_xtalk is representative of the crosstalk from all of the transmission chain channels. While it is not shown explicitly in the other three separate receive channels, they would each have a respective s_xtalk value added representative of the crosstalk affecting the signal on that channel.

Aspects of the present disclosure propose a method of crosstalk compensation in the digital domain for crosstalk that occurs in the analog domain.

Figure 2:
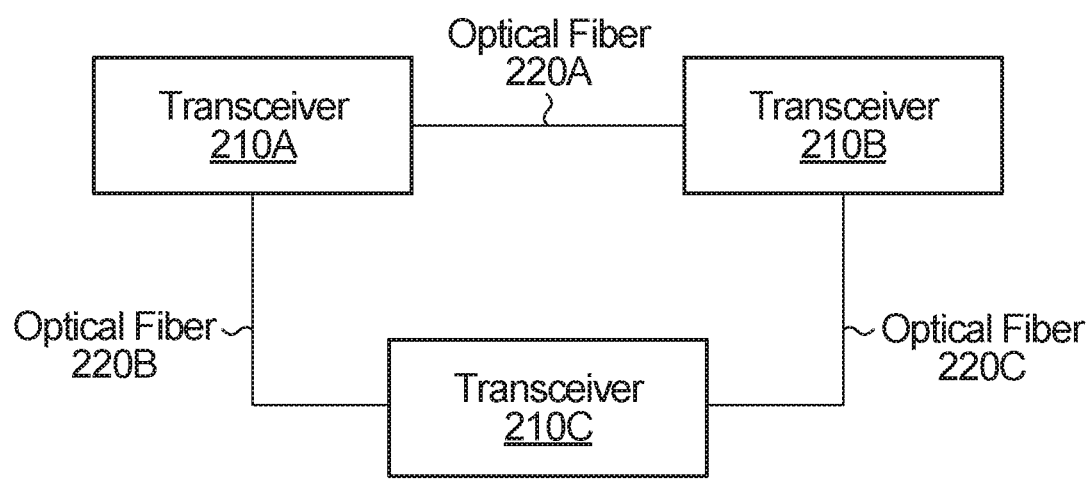
FIG. 2 is a block diagram of an example system in which embodiments of the disclosure may occur.

FIG. 2 illustrates a system in which coherent transceivers may be used. FIG. 2 may be a wavelength division multiplexing optical communication system 200 having a multiple transceivers 210a, 210b and 210c that are connected to one another by an optical conduit, such as optical fiber. Optical fiber 220a connects transceivers 210a and 210b, optical fiber 220b connects transceivers 210a and 210c, and optical fiber 220c connects transceivers 210b and 210c. Each of the transceivers are at a respective location remote from the other transceivers. Each transceiver has a transmitter chain and a receiver chain that includes functional components such as found in FIG. 1. The transmit chain in each transceiver is responsible for transmitting a signal to one, or both, of the other two transceivers and the receiver chain in each transceiver is responsible for receiving a signal from one, or both, of the other two transceivers. This is clearly a very rudimentary example of multiple transceivers being connected together to provide a context for the use of the transmitters. It is to be understood that any number of such transceivers would be connected together.

Figure 3:
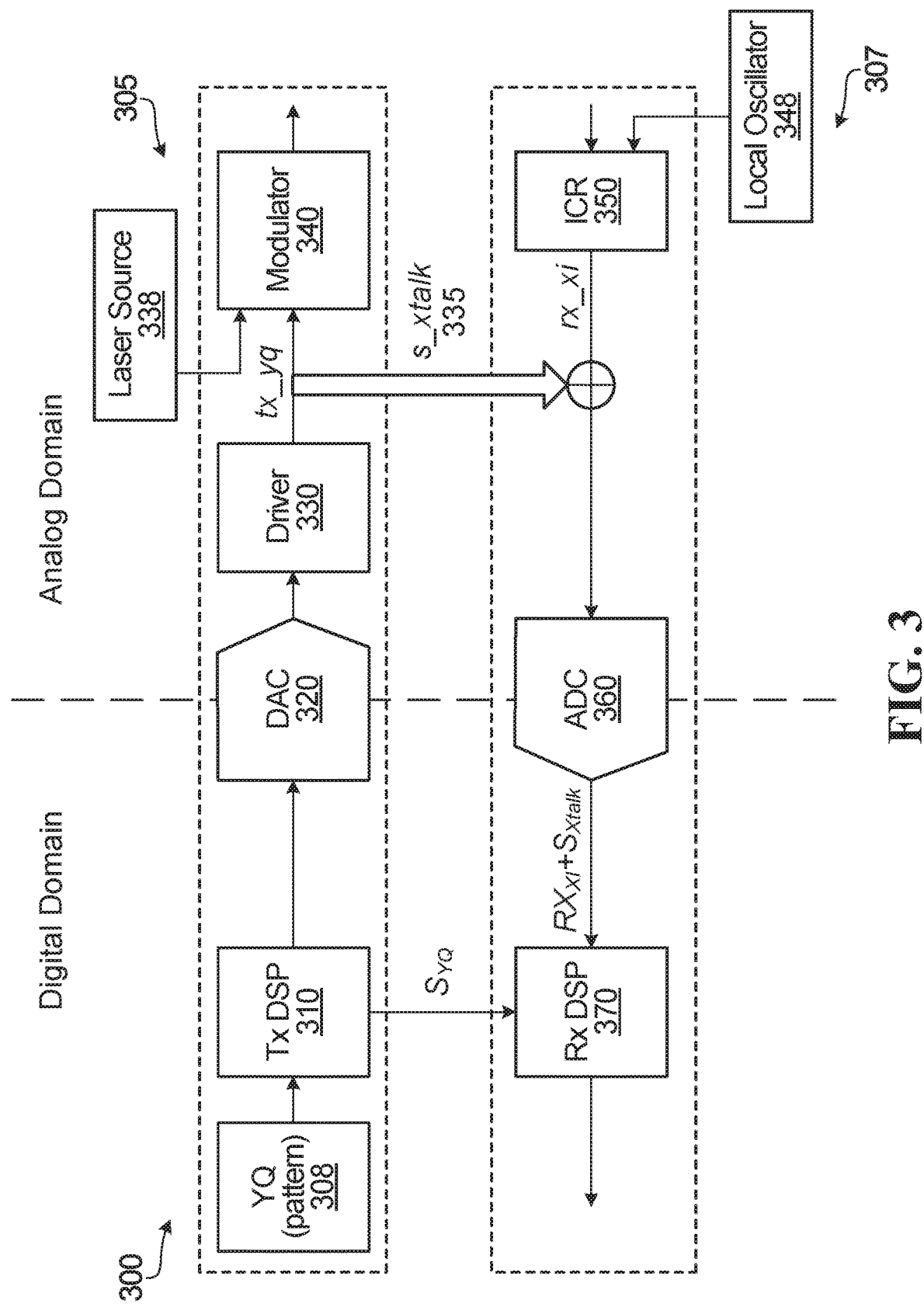
FIG. 3 is a block diagram of a coherent transceiver demonstrating potential crosstalk between a transmitter chain and a receiver chain in which crosstalk compensation may occur according to embodiments of the disclosure.

FIG. 3 illustrates a block diagram of a coherent optical transceiver 300 including a transmitter chain 305 and a receiver chain 307 similar to that of FIG. 1, but which further includes a solution for implementing digital domain crosstalk compensation for crosstalk that occurs in the analog domain. FIG. 3 is used to illustrate a mathematical model for compensating crosstalk s_xtalk that occurs between channels carrying signals tx_yq to rx_xi. While FIG. 3 pertains to a specific occurrence of crosstalk between channels carrying signal tx_yq to tx_xi, it is to be understood that a similar mathematical model could be employed for other occurrences of transmitter chain receiver chain crosstalk (tx_[x or y, q or i] to rx_[x or y, q or i]). For the purposes of discussion, lower-case letters are used when referring to a signal in the analog domain and capital letters are used when referring to a signal in the digital domain.

FIG. 3 includes a Tx DSP 310, a DAC 320, a driver 330 and a modulator 340 (with laser source 338) in a transmitter chain 305. The Tx DSP 310 operates in the digital domain. The DAC 320 converts signals from the digital domain to the analog domain. The driver 330 and the modulator 340 operate in the analog domain. As in FIG. 1, there may be signals on any of channels xi, xq, yi, and yq (analog domain) or XI, XQ, YI, and YQ (digital domain) of the coherent transceiver. Again, the convention for describing signals on the respective channels involves RX and TX for receiver and transmitter, respectively, together with the particular channel and lowercase letters are representative of the analog domain and uppercase letters are representative of the digital domain.

The receiver chain 307 includes an ICR 350 (with local oscillator 348), an ADC 360 and Rx DSP 370. The ICR 350 operates in the analog domain. The ADC 360 converts signals from the analog domain to the digital domain. The Rx DSP 370 operates in the digital domain.

FIG. 3 illustrates in the analog domain crosstalk signal component s_xtalk 335 from the transmitter chain 305, in particular tx_yq, being added to the signal component tx_xi, which is output from the ICR 350. However, while only tx_xi is contemplated in FIG. 3, it is understood that the crosstalk can also include one or more of the three other transmit channels being combined with the output of the ICR 350. The adder symbol shown in FIG. 3 is merely representative of the physical manifestation of the couple that results between the transmit and receive signals. There need not be a physical adder between the transmitter chain 305 and the receiver chain 307.

The combination of rx_xi+s_xtalk is provided to the ADC 360, which converts the analog signal to a digital signal represented as $RX_{XI}+S_{Xtalk}$. The digital signal $RX_{XI}+S_{Xtalk}$ is provided to Rx DSP 370. Another input to the Rx DSP 370 is a digital domain representation of the input pattern received from the Tx DSP 310 in the transmitter chain. In FIG. 3, the digital domain representation of the input pattern is a representation of the signal on the transmit YQ channel, i.e. $S_{YQ}$, as that is the channel that is being considered physically closest to the receiver XI channel. However, it is understood that the transmit digital domain representation can also include one or more of the other three channels.

The signal $S_{YQ}$ in the digital domain is a digital emulation of the signal component tx_yq output from the driver 330 in the analog domain. Therefore, the crosstalk signal component resulting from the signal on channel tx_yq can substantially be determined from $S_{YQ}$.

The crosstalk component $S_{Xtalk}$, which is a result of the signal on channel tx_yq, can then be compensated at the Rx DSP 370 by subtracting the determined crosstalk component that is determined based on $S_{YQ}$. A more detailed example of the processing involved to determine the crosstalk based on $S_{YQ}$ follows below.

Figure 4:
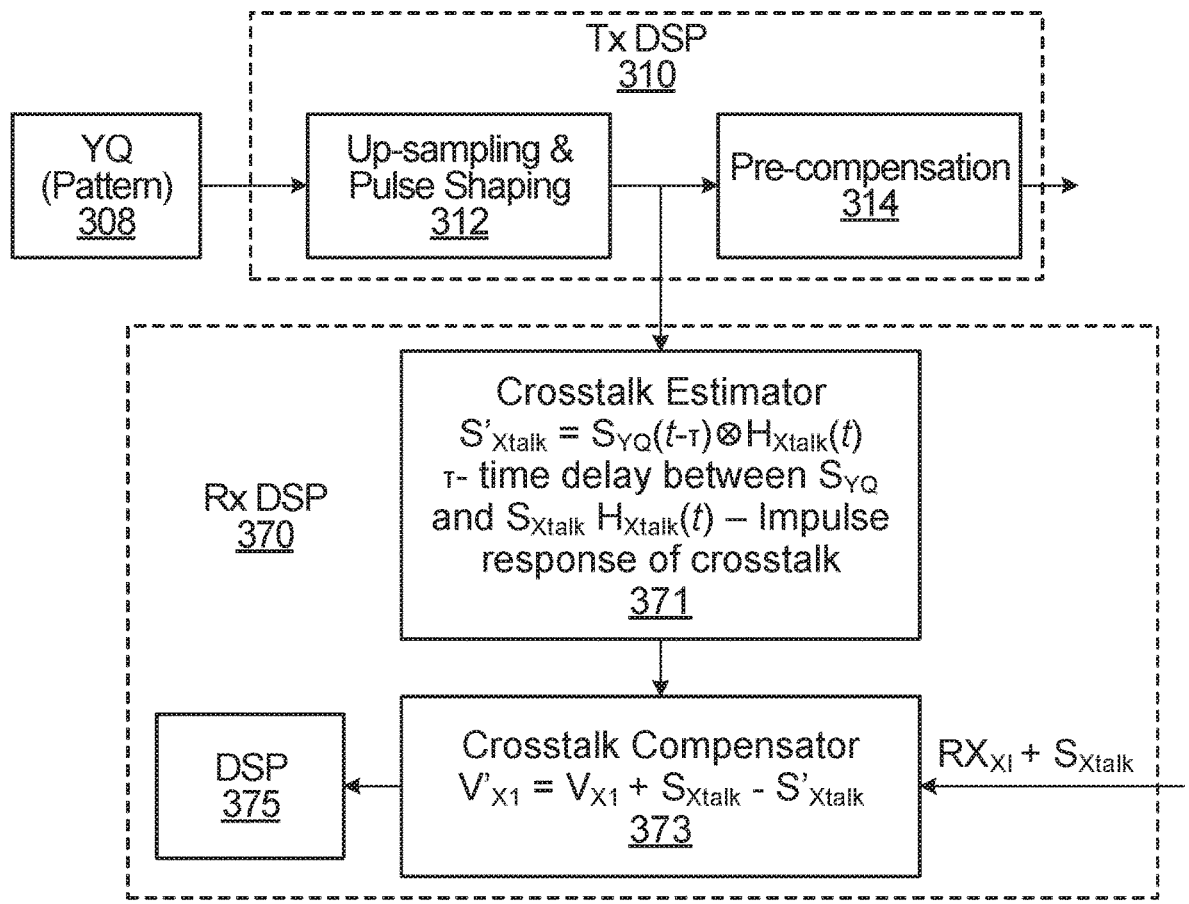
FIG. 4 is a block diagram showing further detail of functional blocks of FIG. 3 according to an aspect of the present disclosure.

FIG. 4 is a block diagram illustrating example operations that may be performed in Tx DSP 310 and Rx DSP 370 of FIG. 3.

Tx DSP 310 is illustrated in FIG. 4 including an upsampling and pulse shaping processing block 312 and a pre-compensation block 314. The pre-compensation block 314 performs pre-compensation in the Tx DSP 310 to compensate for effects that occur in the DAC 320 and driver 330 in the transmitter chain 305 of FIG. 3. In some embodiments, the pre-compensation is S21 pre-compensation. The input bits corresponding to the YQ pattern 308 provided to the Tx DSP 310 are provided to the upsampling and pulse shaping processing block 312. An output of the upsampling and pulse shaping processing block 312 is provided to the pre-compensation block 314. In order that the $S_{YQ}$ value is representative of the tx_yq signal component occurring after the DAC 320 and the driver 330 in the transmitter chain 305, the value of $S_{YQ}$ should be representative of a value before the pre-compensation block 314. Therefore, the $S_{YQ}$ component that is provided to the RX DSP 370 is an output of the upsampling and pulse shaping processing block 312.

In an alternative form of a Tx DSP, a DAC sample rate may be equivalent to a data symbol rate and so upsampling and pulse shaping may not be used in such a Tx DSP.

Rx DSP 370 is illustrated in FIG. 4 including a Crosstalk Estimator 371 used to determine an estimate of the crosstalk component $S'_{Xtalk}$. In the scenario being described in FIGS. 3 and 4, $S'_{Xtalk}$ is $S'_{YQ}$ as the crosstalk component being considered is from tx_yq. The output $S'_{Xtalk}$ of the Crosstalk Estimator 371 is provided to a Crosstalk Compensator 373. The Crosstalk Compensator 373 also receives the output $RX_{XT}+S_{Xtalk}$ from the ADC 360. The Crosstalk Compensator 373 subtracts the estimate of the crosstalk component $S'_{Xtalk}$ from $RX_{XT}+S_{Xtalk}$. Since $S'_{Xtalk}$ should substantially be equal to $S_{Xtalk}$, the crosstalk should be substantially compensated.

The output of the Crosstalk Compensator 373 can then be provided to DSP 375 for further processing.

The value of $S_{Xtalk}$ that is part of the signal provided to the Rx DSP 370 can be considered a delayed version of $S_{YQ}$ multiplied by an impulse response $H_{Xtalk}(t)$. The impulse response $H_{Xtalk}(t)$ includes a distributed feedback of crosstalk, crosstalk magnitude and dependence of frequency.

A time delay $\tau$ (the symbol tau) is used to compensate for the time the RF signal takes to travel from the Tx DSP 310 via the Tx DAC 320 and the driver 330 in the transmitter chain 305 to the Rx DSP 370 via the ADC 360 in the receiver chain 307. It should be noted that if the RF link from the driver 330 to the modulator 340 in the transmitter chain 305 is long, i.e. the time delay $\tau$ is larger than a symbol period, then the time delay r is not a single discrete value but is a small range. In such a case, r indicates the center of the range.

In the Crosstalk Estimator 371, the estimated version of crosstalk $S'_{Xtalk}$ is determined based on the time delayed version of $S_{YQ}$ convolved with the impulse response $H_{Xtalk}(t)$, which is represented by the mathematical relationship $S'_{Xtalk}=S_{YQ}(t-\tau)\otimes H_{Xtalk}(t)$. The crosstalk $S_{Xtalk}$ is then be compensated by subtracting the estimated crosstalk $S'_{Xtalk}$ from the input signal to the RX DSP 510, i.e. $RX_{XT}+S_{Xtalk}$ as shown in FIG. 4.

Figure 5:
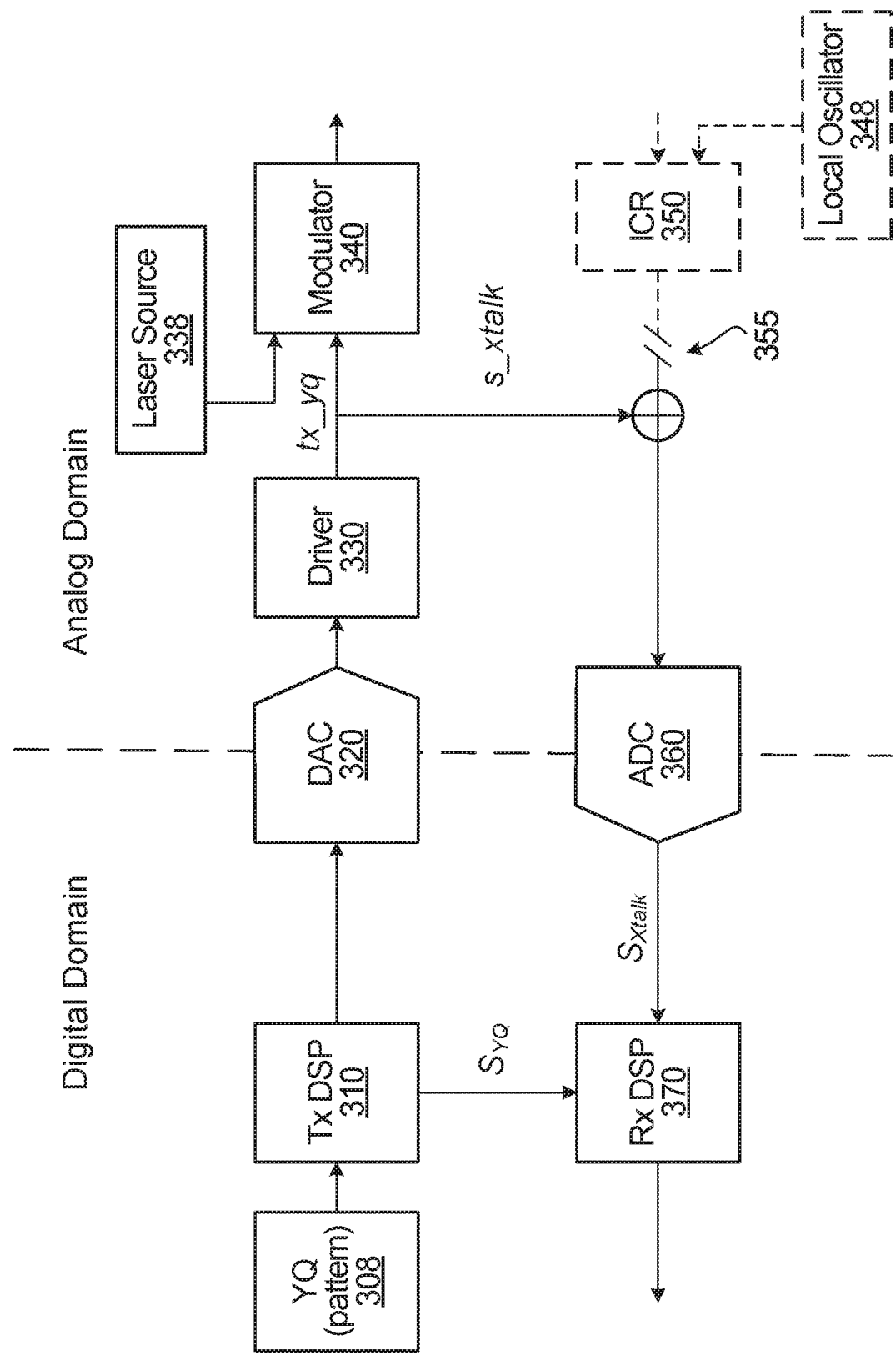
FIG. 5 is a block diagram of a coherent transceiver demonstrating an example of calibrating a crosstalk compensation element according to an aspect of the present disclosure.

In order to properly compensate for the crosstalk generated in the analog domain, a value of the time delay $\tau$ and an appropriate impulse response $H_{Xtalk}(t)$ are determined. In some embodiments, the calibration can be performed to determine the crosstalk effect of each transmit channel on each received channel and then the crosstalk effects can be combined to determine an overall cross talk effect for each received channel. A manner of calibrating the value of the time delay r and an appropriate impulse response $H_{Xtalk}(t)$ as performed in the Crosstalk Estimator of FIG. 4 is shown in FIG. 5. The functional blocks in FIG. 5 are numbered the same as in FIG. 3.

An open circuit 355 is shown between the ICR 350 and the Rx ADC 360. The open circuit 355 can be operated to open circuit any of the receive channels individually or in combination to ensure that, as a result, the only signal component being provided to the Rx ADC 360 is the crosstalk component s_xtalk from the transmitter, which in the case of FIG. 5 is illustrated to be the crosstalk of the yq transmission channel. It should also be understood that the transmitter chain can be controlled such that only a single channel, for example carrying the real or imaginary component of the vertical or horizontal polarization component or a combination of channels, is propagated through the transmitter channel so that crosstalk between particular channels can be determined. The only signal detected at the Rx DSP 370 is $S_{Xtalk}$, which is the crosstalk, because there is no received signal due to the open circuit.

The time delay $\tau$ between $S_{YQ}$ and crosstalk $S_{Xtalk}$ can be obtained by performing a cross correlation operation of $S_{YQ}$ and $S_{Xtalk}$.

In some embodiments, up-sampling of the signal prior to performing the cross correlation operation may be used to enable better accuracy. The upsampling of the two signals $S_{YQ}$ and $S_{Xtalk}$ may be performed in the Rx DSP 370. The upsampling for $S_{YQ}$ may be done prior to the Crosstalk Estimator 371 in FIG. 4 or may be done as a preliminary step in the Crosstalk Estimator 371. The upsampling for $S_{Xtalk}$ may be done prior to the Crosstalk Compensator 373 in FIG. 4 or may be done as a preliminary step in the Crosstalk Compensator 373. The accuracy is improved when using a larger number of signal samples. After the cross correlation operation of $S_{YQ}$ and $S_{Xtalk}$ to determine the time delay r is completed, an impulse response $H_{Xtalk}(t)$ can be determined.

As indicated above, the estimated crosstalk $S'_{Xtalk}$ can be determined based on the mathematical relationship $S'_{Xtalk}=S_{YQ}(t-\tau)\otimes H_{Xtalk}(t)$. The impulse response $H_{Xtalk}(t)$ can be determined during the calibration process because values for both $S'_{Xtalk}$ and $S_{YQ}(t-\tau)$ are known. The value of $S'_{Xtalk}$ while normally being an estimate value, in this case is the signal $S_{Xtalk}$, which is the signal on channel tx_yq that is converted by ADC 360 because there is no received signal due to the open circuit. The value of $S_{YQ}(t-\tau)$ is known based on the value of $S_{YQ}$ provided by Tx DSP 310 that is time shifted based on the time delay $\tau$.

In some embodiments, the value of impulse response $H_{Xtalk}(t)$ can be obtained based on the following operations, in which the subscript n indicates a number of taps used in the impulse response. The Tx values are representative of transmit values that correspond to a matrix representation of $S_{YQ}(t-\tau)$. The Rx values are representative of receive values that correspond to a vector representation of $S_{Xtalk}$. The h values are representative of the impulse response values that correspond to a vector representation of $H_{Xtalk}(t)$.

$$S_{YQ}(t-\tau) \otimes H_{Xtalk}(t) = S'_{Xtalk}$$

$$\begin{bmatrix} T_{x_n} & \cdots & T_{x_3} & T_{x_2} & T_{x_1} \\ T_{x_{n+1}} & \cdots & T_{x_4} & T_{x_3} & T_{x_2} \\ T_{x_{n+2}} & \cdots & T_{x_5} & T_{x_4} & T_{x_3} \\ \vdots & \vdots & \vdots & \vdots & \vdots \\ T_{x_{n+k-1}} & \cdots & T_{x_{k+2}} & T_{x_{k+1}} & T_{x_k} \end{bmatrix} \times \begin{bmatrix} h_1 \\ h_2 \\ h_3 \\ \vdots \\ h_n \end{bmatrix} = \begin{bmatrix} Rx_i \\ Rx_{i+1} \\ Rx_{i+2} \\ \vdots \\ Rx_{i+k-1} \end{bmatrix}$$

$$i = \text{round}(n/2)$$

$$[TxSig] \times \vec{H} = \overline{S_{Xtalk}}$$

-continued $$\vec{H} = [[TxSig]^T \cdot [TxSig]]^{-1} \cdot [TxSig]^T \cdot \vec{S_{Xtalk}}$$

Using a matrix representation for the known values, the impulse response can be determined by the Crosstalk Estimator 371 in Rx DSP 370.

For the crosstalk from other transmit channels (tx_xi, tx_xq, and tx_yi) to rx_xi, the same calibration can be done to obtain emulated crosstalk values for $S'_{Xtalk\_txxi}$, $S'_{Xtalk\_txxq}$, $S'_{Xtalk\_txyi}$.

Following the calibration process, i.e. once the time delay τ and the impulse response $H_{Xtalk}(t)$ are determined, those values can be used to determine the estimated crosstalk in order to compensate for the crosstalk. For example, the overall crosstalk from all transmit channels to the rx_xi channel can be compensated at the Rx DSP 370 by subtracting the emulated crosstalk values from rx_xi signal as shown in the equation below.

$$V'_{xI} = V_{xI} + S_{Xtalk\_txxi} + S_{Xtalk\_txxq} + S_{Xtalk\_txyi} + S_{Xtalk\_txyq} - S'_{Xtalk\_txxi} - S'_{Xtalk\_txxq} - S'_{Xtalk\_txyi} - S'_{Xtalk\_txyq}$$

Crosstalk compensation for the other receive channels can be done in a similar manner.

Figure 6:
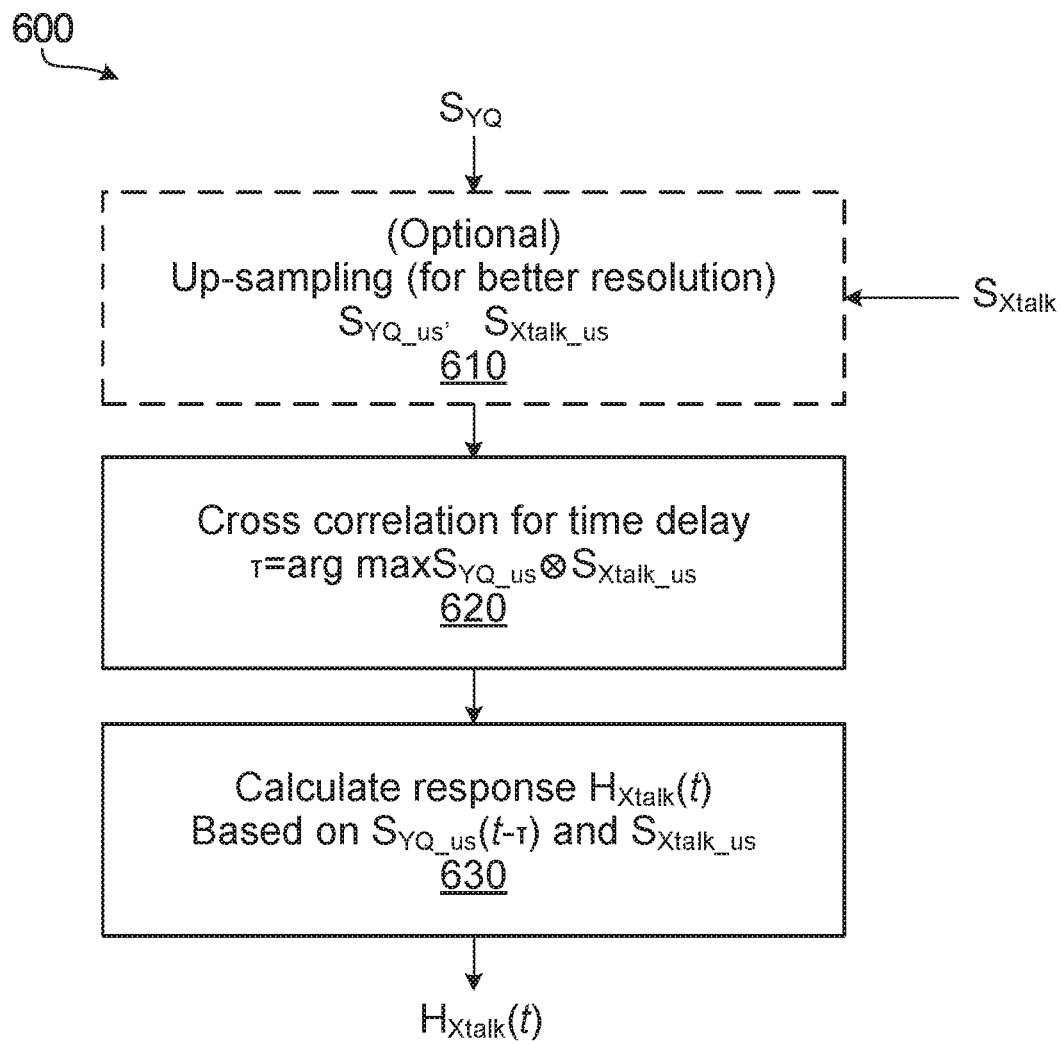
FIG. 6 is a flow chart illustrating an example method performed to calibrate a crosstalk compensation element in the digital domain, for crosstalk that occurs in the analog domain, according to an embodiment of the present disclosure.

FIG. 6 illustrates an example flow chart 600 of how the crosstalk calibration may be performed for determining the time delay τ and the impulse response $H_{Xtalk}(t)$ with regard to crosstalk occurring in the analog domain from the yq transmit channel and on a receive channel. Crosstalk calibration for the other transmit channels yi, xq and xi on one or more receive channels could be performed in a similar manner.

A first optional step 610 involves performing upsampling of both the YQ channel data $S_{YQ}$ received from the transmit chain and the crosstalk data $S_{Xtalk}$ in the receive chain that has been converted to the digital domain by the ADC in the receive chain resulting in upsampled versions of both data $S_{YQ\_us}$ and $S_{Xtalk\_us}$. The $S_{Xtalk}$ and $S_{Xtalk\_us}$ correspond to the crosstalk signal caused by the yq channel on a particular receive channel as the receive channel has been open circuited.

Cross correlation is performed at step 620 to determine the time delay τ, based on the relationship of $\arg_t \max (S_{YQ\_us} \otimes S_{Xtalk\_us})$, i.e. the time delay τ is determined based on an occurrence of a maximum value of the correlation of the two signals indicating when they would overlap in time.

At step 630, the $H_{Xtalk}(t)$ impulse response is determined based in a relationship between $S_{YQ\_us}(t-\tau)$ and $S_{Xtalk\_us}$.

The calibration described above can be performed initially and may then be performed again as needed to ensure a proper calibration factor is maintained.

A method similar to that described above could also be based on a dynamic calibration. In the case of the dynamic calibration, the receiver chain is not open circuited, but has a received data input. As the receiver chain is still receiving data, a longer time average may be needed to perform the calibration process and obtain the appropriate time delay τ and the $H_{Xta}(t)$ impulse response.

Figure 7:
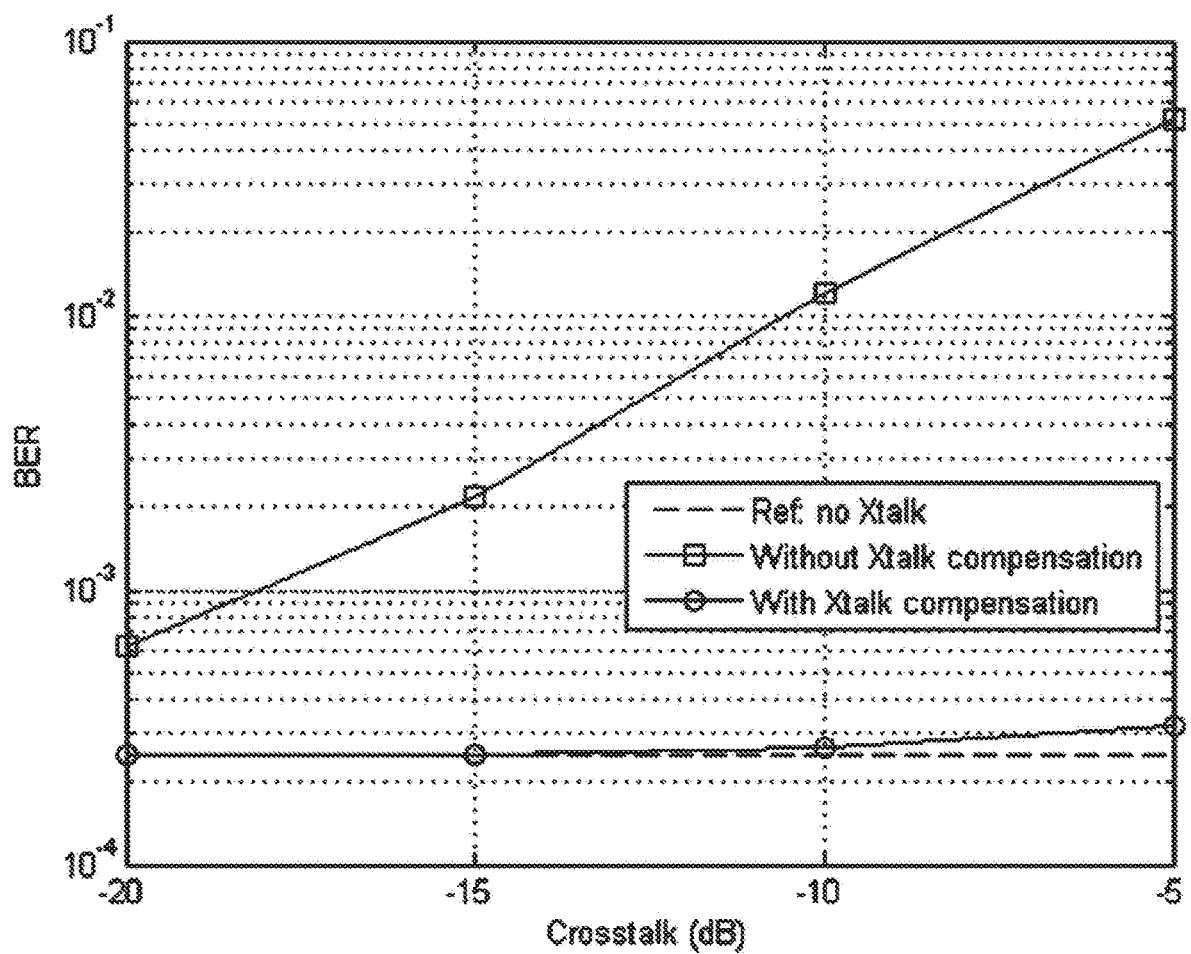
FIG. 7 illustrates a graphical plot resulting from a computer simulation for a crosstalk compensation solution according to an embodiment of the present disclosure.

FIG. 7 shows a graphical plot of a simulation result for 100 Gigabit Quadrature Phase Shift Keying (QPSK) modulation (33.675 GBaud). The x-axis is crosstalk in dB and is defined as 20*log 10(rms(s_xtalk)/rms(tx_yq)). The y-axis is illustrating bit error rate (BER) for a particular crosstalk value.

In the simulation, for simplicity, it is assumed that the time delay from the driver to the modulator (i.e. driver 330 and modulator 340 in FIG. 3) is less than a symbol period and the crosstalk is not frequency dependent.

Without crosstalk compensation, the BER increases greatly from $6.4 \times 10^{-4}$ to $5.2 \times 10^{-2}$ with an increment of crosstalk from −20 dB to −5 dB.

However, with crosstalk compensation as described in the present application, the BER is greatly reduced. With an increment of crosstalk from −20 dB to −5 dB, the BER increases from $2.5 \times 10^{-4}$ to $3.2 \times 10^{-4}$. The small BER increment results from a difference between the estimate crosstalk $S'_{Xtalk}$ based on Tx signal and the real crosstalk $S_{Xtalk}$ on Rx signal. This difference may be in part due to finite effective number of bits (ENOB) of the DAC in the transmitter chain and the ADC in the receiver chain and inaccuracies of the convolution and impulse response calculations.

In the simulation the voltage level of tx_yq is similar to rx_xi. However in the integrated device, the voltage level of tx_yq might be much larger (around 20 dB) than rx_xi. In such a scenario the crosstalk induced penalty would be larger than that shown in the FIG. 7.

Figure 8:
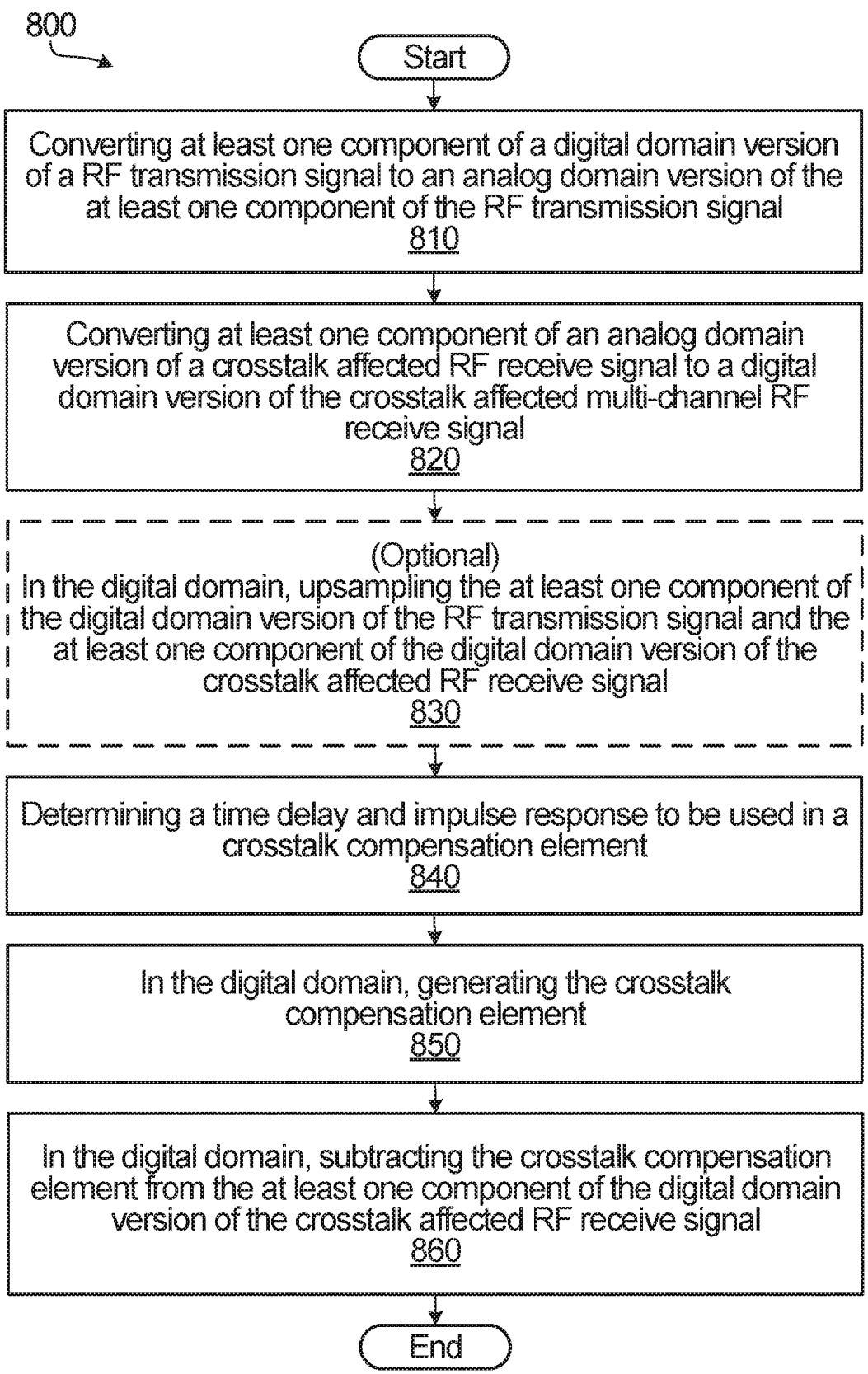
FIG. 8 is a flow chart illustrating an example method performed to compensate crosstalk in the digital domain that occurs in the analog domain according to an embodiment of the present disclosure.

FIG. 8 is an example flow diagram 800 that describes a method for, in the digital domain, compensating crosstalk occurring in the analog domain between transmit and receive RF signals in a coherent optical transceiver implemented on a photonic integrated circuit.

Step 810 involves, converting at least one component of a digital domain version of a RF transmission signal to an analog domain version of the at least one component of the RF transmission signal. The at least one component of the digital domain version of the RF transmission signal may be, for example, a digital domain version of any of the real and imaginary components of horizontal and vertical polarization components of the RF transmission signal.

Step 820 involves, converting at least one component of an analog domain version of a crosstalk affected RF receive signal to a digital domain version of the at least one component of the crosstalk affected RF receive signal. The at least one component of the analog domain version of the crosstalk affected RF transmission signal may be, for example, an analog domain version of any of the real and imaginary components of horizontal and vertical polarization components of the RF receive signal that has been affected by crosstalk resulting from close proximity of at least one component of an analog domain version of any of the real and imaginary components of horizontal and vertical polarization components of the RF transmission signal.

Step 830 is an optional step that involves, in the digital domain, upsampling the at least one component of the digital domain version of the RF transmission signal and the at least one component of the digital domain version of the crosstalk affected RF receive signal. The at least one component of the digital domain version of the RF transmission signal is a version of the transmission signal that has not been pre-compensated for effects of additional processing in a transmit chain in the coherent optical transceiver.

Step 840 involves determining a time delay and impulse response to be used in a crosstalk compensation element in the digital domain. An example of how this may be performed in shown in the FIG. 6.

Step 850 involves, generating a crosstalk compensation element. A substep of generating the crosstalk compensation element involves delaying at least one component of the digital domain version of the RF transmission signal. An additional subset of generating the crosstalk compensation element involves convolving the delayed at least one component of the digital domain version of the RF transmission signal with a digital domain version of an impulse response, the crosstalk occurring between an analog domain version of the at least one component of the RF transmission signal and an analog domain version of at least one component of the RF receive signal.

Step 860 involves, also in the digital domain, subtracting the crosstalk compensation element from a digital domain version of at least one component of the crosstalk affected RF receive signal.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

In addition, it would be understood that the steps described above and referred to with regard to FIG. 8 do not necessarily need to be performed in the exact temporal order as indicated.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   in the digital domain, compensating crosstalk occurring in the analog domain between transmit and receive radio frequency (RF) signals in a coherent optical transceiver implemented on a photonic integrated circuit, the compensating comprising delaying a digital domain version of the transmit RF signal and convolving the delayed digital domain version of the transmit RF signal with a digital domain version of an impulse response.

2. The method of claim 1, wherein the compensating comprises:
   in the digital domain, generating a crosstalk compensation element by:
      delaying at least one component of the digital domain version of the RF transmission signal; and
      convolving the at least one delayed component of the digital domain version of the RF transmission signal with the digital domain version of the impulse response, the crosstalk occurring between an analog domain version of the at least one signal component of the RF transmission signal and an analog domain version of at least one component of an analog domain version of a RF receive signal; and
   subtracting the crosstalk compensation element from a digital domain version of the crosstalk affected RF receive signal.

3. The method of claim 2 further comprising upsampling the at least one component of the digital domain version of the RF transmission signal and the digital domain version of the crosstalk affected RF receive signal.

4. The method of claim 2 further comprising converting the at least one component of the digital domain version of the RF transmission signal to an analog domain version of the at least one component of the RF transmission signal.

5. The method of claim 2 further comprising converting the analog domain version of the crosstalk affected RF receive signal to the digital domain version of the crosstalk affected RF receive signal.

6. The method of claim 2, wherein, in the digital domain, the at least one signal component of the digital domain version of the RF transmission signal is a version of the at least one signal component that has not been pre-compensated for effects of additional processing on a transmit chain in the coherent optical transceiver.

7. The method of claim 2, wherein the digital domain version of the RF transmission signal comprises one or more of:
   a) a digital domain version of a real component of a horizontal polarization component of the transmission signal;
   b) a digital domain version of a real component of a vertical polarization component of the transmission signal;
   c) a digital domain version of an imaginary component of a horizontal polarization component of the transmission signal; and
   d) a digital domain version of an imaginary component of a vertical polarization component of the transmission signal.

8. The method of claim 2, wherein the analog domain version of the RF receive signal comprises one or more of:
   a) a real component of a horizontal polarization component of the receive signal;
   b) a real component of a vertical polarization component of the receive signal;
   c) an imaginary component of a horizontal polarization component of the receive signal; and
   d) an imaginary component of a vertical polarization component of the receive signal.

9. The method of claim 2 further comprising:
   during a calibration period when a receiver chain of the coherent optical transceiver is configured in an open circuit mode such that no receive data is processed, determining a delay used in the delaying of the at least one component-of the digital domain version of the RF transmission signal; and
   determining the impulse response used in convolving the at least one delayed component of the digital domain version of the RF transmission signal to generate the crosstalk compensation element.

10. The method of claim 2 further comprising:
   during a calibration period when a receiver chain is receiving data, determining the delay used in the delaying of the at least one component of the digital domain version of the RF transmission signal; and determining the impulse response used in convolving the at least one delayed component of the digital domain version of the RF transmission signal to generate the crosstalk compensation element.

11. The method of claim 9 wherein the impulse response is determined using the formula:

$$\vec{H} = [[TxSig]^T \cdot [TxSig]]^{-1} \cdot [TxSig]^T \cdot \overrightarrow{S_{Xtalk}}$$

wherein $\vec{H}$ s the impulse response, [TxSig] is a matrix representation of a digital domain version of the signal on the at least one channel of the RF transmission signal, $[TxSig]^T$ is the transpose of the matrix representation of the digital domain version of the signal on the at least one channel of the RF transmission signal, and $\overrightarrow{S_{Xtalk}}$ is the digital domain version of the crosstalk affected RF receive signal.

12. The method of claim 11, wherein the impulse response is determined using a matrix based calculation.

13. A digital signal processor (DSP) configured to:
in the digital domain, compensate crosstalk occurring in the analog domain between transmit and receive radio frequency (RF) signals in a coherent optical transceiver implemented on a photonic integrated circuit, the compensation of the crosstalk comprising delaying a digital domain version of the transmit RF signal and convolving the delayed digital domain version of the transmit RF signal with a digital domain version of an impulse response.

14. The DSP of claim 13, wherein the DSP is configured to:
in the digital domain, generate a crosstalk compensation element by:
delaying at least one component of the digital domain version of the RF transmission signal; and
convolving the at least one delayed component of the digital domain version of the RF transmission signal with the digital domain version of the impulse response, the crosstalk occurring between an analog domain version of the at least one signal component of the RF transmission signal and an analog domain version of at least one component of an analog domain version of a RF receive signal; and
subtract the crosstalk compensation element from a digital domain version of the crosstalk affected RF receive signal.

15. The DSP of claim 14 further configured to upsample the at least one component of the digital domain version of the RF transmission signal and the digital domain version of the crosstalk affected RF received signal.

16. The DSP of claim 14 further configured to convert the at least one component of the digital domain version of the RF transmission signal to an analog domain version of the at least one component of the RF transmission signal.

17. The DSP of claim 14 further configured to convert the analog domain version of the crosstalk affected RF receive signal to the digital domain version of the crosstalk affected RF received signal.

18. The DSP of claim 14, wherein, in the digital domain, the at least one signal component of the digital domain version of the RF transmission signal is a version of the at least one signal component that has not been pre-compensated for effects of additional processing on a transmit chain in the coherent optical transceiver.

19. The DSP of claim 14, wherein the at least one component of a digital domain version of the RF transmission signal comprises one or more of:
a) a digital domain version of a real component of a horizontal polarization component of the transmission signal;
b) a digital domain version of a real component of a vertical polarization component of the transmission signal;
c) a digital domain version of an imaginary component of a horizontal polarization component of the transmission signal; and
d) a digital domain version of an imaginary component of a vertical polarization component of the transmission signal.

20. The DSP of claim 14, wherein the at least one component of the analog domain version of the RF receive signal comprises one or more of:
a) a real component of a horizontal polarization component of the receive signal;
b) a real component of a vertical polarization component of the receive signal;
c) an imaginary component of a horizontal polarization component of the receive signal; and
d) an imaginary component of a vertical polarization component of the receive signal.

21. The DSP of claim 14 configured to, during a period when a receiver chain of the coherent optical transceiver is configured in an open circuit mode such that no received data is processed:
determine a delay used in the delaying the at least one component of the digital domain version of the RF transmission signal; and
determine the impulse response used in convolving the at least one delayed component of the digital domain version of the RF transmission signal to generate the crosstalk compensation element.

22. The DSP of claim 14 configured to, during a calibration period when a receiver chain of the coherent optical transceiver is receiving data:
determine a delay used in the delaying the at least one component of the digital domain version of the RF transmission signal; and
determine the impulse response used in convolving the at least one delayed component of the digital domain version of the RF transmission signal to generate the crosstalk compensation element.

23. The DSP of claim 21 wherein the impulse response is determined using the formula:

$$\vec{H} = [[TxSig]^T \cdot [TxSig]]^{-1} \cdot [TxSig]^T \cdot \overrightarrow{S_{Xtalk}}$$

wherein $\vec{H}$ is the impulse response, [TxSig] is a matrix representation of a digital domain version of the signal on the at least one channel of the RF transmission signal, $[TxSig]^T$ is the transpose of the matrix representation of the digital domain version of the signal on the at least one channel of the RF transmission signal, and $\overrightarrow{S_{Xtalk}}$ is the digital domain version of the crosstalk affected RF receive signal.

24. The DSP of claim 23, wherein the impulse response is determined using a matrix based calculation.

25. A coherent optical transceiver implemented on a photonic integrated circuit comprising a digital signal processor according to claim 13.

* * * * *

UNITED STATES PATENT AND TRADEMARK OFFICE
CERTIFICATE OF CORRECTION

PATENT NO. : 11,038,598 B1
APPLICATION NO. : 16/801608
DATED : June 15, 2021
INVENTOR(S) : Jianhong Ke et al.

Page 1 of 1

It is certified that error appears in the above-identified patent and that said Letters Patent is hereby corrected as shown below:

In the Claims

Column 15, Claim 11, Line 10:
"…wherein $\bar{\bar{H}}$ s the impulse response, [TxSig] is a matrix…"
Should read:
-- wherein $\bar{\bar{H}}$ is the impulse response, [$TxSig$] is a matrix --

Column 15, Claim 11, Line 13:
"…[TxSig]$^T$ is the transpose of the matrix representation of the…"
Should read:
-- [$TxSig$]$^T$ is the transpose of the matrix representation of the --

Column 16, Claim 23, Line 51:
"…wherein $\bar{\bar{H}}$ is the impulse response, [TxSig] is a matrix…"
Should read:
-- wherein $\bar{\bar{H}}$ is the impulse response, [$TxSig$] is a matrix --

Column 16, Claim 23, Line 54:
"…[TxSig]$^T$ is the transpose of the matrix representation…"
Should read:
-- [$TxSig$]$^T$ is the transpose of the matrix representation --

Signed and Sealed this
Eighteenth Day of February, 2025

Coke Morgan Stewart
*Acting Director of the United States Patent and Trademark Office*